(12) United States Patent
Cullen

(10) Patent No.: US 6,371,066 B1
(45) Date of Patent: Apr. 16, 2002

(54) TORQUE BASED CAM TIMING CONTROL METHOD AND SYSTEM

(75) Inventor: Michael John Cullen, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/737,383

(22) Filed: Dec. 15, 2000

(51) Int. Cl.[7] .................................................. F01L 1/34
(52) U.S. Cl. ................. 123/90.15; 123/90.16; 123/90.17; 123/322; 123/406.24
(58) Field of Search ................. 123/90.15, 90.16, 123/90.17, 90.18, 322, 406.24, 436

(56) References Cited

U.S. PATENT DOCUMENTS

| | | | |
|---|---|---|---|
| 4,577,592 A | * | 3/1986 | Bosch ...................... 123/90.15 |
| 5,009,203 A | | 4/1991 | Seki |
| 5,117,784 A | | 6/1992 | Schechter et al. |
| 5,159,905 A | | 11/1992 | Sugiuchi et al. |
| 5,168,851 A | | 12/1992 | Itoyama et al. |
| 5,195,470 A | | 3/1993 | Ikeura |
| 5,199,403 A | * | 4/1993 | Akazaki ...................... 123/478 |
| 5,222,465 A | | 6/1993 | Sakamoto et al. |
| 5,609,126 A | | 3/1997 | Cullen et al. |
| 5,622,144 A | | 4/1997 | Nakamura et al. |
| 5,680,834 A | | 10/1997 | Szpak et al. |
| 5,857,437 A | | 1/1999 | Yoshioka |
| 5,957,096 A | | 9/1999 | Clarke et al. |
| 6,006,725 A | | 12/1999 | Stefanopoulou et al. |

* cited by examiner

Primary Examiner—Thomas Denion
Assistant Examiner—Jaime Corrigan
(74) Attorney, Agent, or Firm—Carlos Hanze

(57) ABSTRACT

A torque based cam timing system and method for an engine having dual independent camshafts is disclosed that includes a first set of ROM based calibration tables containing values for intake valve closing and valve overlap that provide best fuel economy and emissions over the operating range of engine speed and engine indicated torque and a second set of ROM based calibration tables containing values for intake valve closing and valve overlap for optimal power over the operating range of engine speed. A power index value that indicates the change in driver desire from fuel economy to power, is used to interpolate over the range of values in the first set of tables to the values in the second set of tables to calculate values of intake valve closing and valve overlap that are optimal for all altitudes.

20 Claims, 3 Drawing Sheets

TORQUE BASED CAM TIMING CONTROL METHOD AND SYSTEM

BACKGROUND OF THE INVENTION

1. Field of the Invention

This invention relates to electronic engine control and, more particularly, to a method and system for controlling cam timing.

2. Background Art

Variable cam timing systems operate to vary the timing between the camshaft and the crankshaft to optimize engine performance over the entire range of engine operation. Systems such as that described in U.S. Pat. No. 5,117,784 to Schechter et al., assigned to the assignee of the present invention, vary the timing between the camshaft and crankshaft to achieve improved idle stability, expanded torque curve over the RPM (revolutions per minute) range of the engine, better control of emission gases, and possible elimination of external gas recirculation components and circuitry.

It is known that optimal cam timing for fuel economy and emissions may be achieved by determining the timing as a function of engine speed and air charge entering the engine in lbs/cylinder filling. Optimal cam timing for power may be achieved by determining the cam timing as a function of engine speed and throttle position. Either of the aforesaid control methods can generate cam timing to achieve satisfactory fuel economy, emissions and performance for a particular altitude, usually sea level. However, as the altitude at which a vehicle is operated increases, a control method calibrated for sea level operation provides less than optimal results because the air charge entering the engine at a given throttle position decreases.

In U.S. Pat. No. 5,609,126 to Cullen et al, assigned to the assignee of the present invention, a variable cam timing system which provides optimal fuel economy, emissions and performance at a variety of altitudes is disclosed. In that patent, a first intermediate camshaft phase angle is retrieved as a function of engine speed and air charge and a second intermediate camshaft phase angle is retrieved as a function of engine speed and throttle position. The first intermediate camshaft phase angle is compared to the second intermediate camshaft phase angle, and the cam phase angle is determined as a function of the camshaft phase angle which corresponds to the least amount of camshaft timing retard. Alternatively, an interpolator value based on engine speed and throttle position is used to interpolate between the first and second intermediate phase angles to obtain the desired cam phase angle.

Where the engine is equipped with independent intake and exhaust valve camshafts, it is desirable that a system be provided for independently adjusting the rotational position of one camshaft relative to the other and each relative to the engine crankshaft. Such dual independent cam timing offers fuel economy advantages but is inherently complex to optimize. For example, maximum spark for best torque (MBT) must be calculated and varied with valve timing. Accordingly, there is a need for a dual independent cam timing method that optimizes control system behavior while minimizing complexity.

SUMMARY OF THE INVENTION

It is an object of the present invention to provide an improved cam timing method for an engine having dual independent camshafts. In accordance with a preferred embodiment of the present invention, calibration values for intake valve closing (IVC) and valve overlap (OL) that provide best fuel economy and emissions over the operating range of engine speed and indicated torque are contained in respective ROM based schedule tables that form a set of stability limited (SL) tables optimized to provide best fuel economy. A second set of ROM based schedule tables is provided that contains calibration values for IVC and OL for optimal power (OP) over the operating range of engine speed.

A performance or power index (PI) value, that indicates the driver's relative desire for fuel economy or power, is obtained from a ROM based lookup table. The PI value is a function of the percent of available indicated torque demanded or desired by the driver. The PI value is used to interpolate over the range of values in the SL tables to the values in the OP tables to calculate values of IVC and OL that are optimal for all altitudes and levels of driver demand.

By using the percent of peak available indicated torque as the input to the interpolator table, aggressive cam timing schedules with high residual fraction can be used for optimal fuel economy with good driveability. Higher residual fraction improves fuel efficiency by reducing the torque required to pump the air into the cylinder and by reducing heat transfer losses from the combusted mixture to the surrounding walls and engine coolant. Another benefit of high residual fraction is a reduction in $NO_x$ emissions. Also, driver demanded torque is a function of pedal position. As soon as the controller reads the driver demand the desired cam timing settings can be scheduled. It takes a finite time for the camshaft to position itself so this feed forward capability permits the camshaft to move as soon as possible.

DETAILED DESCRIPTION OF THE PREFERRED EMBODIMENT(S)

Figure 1:
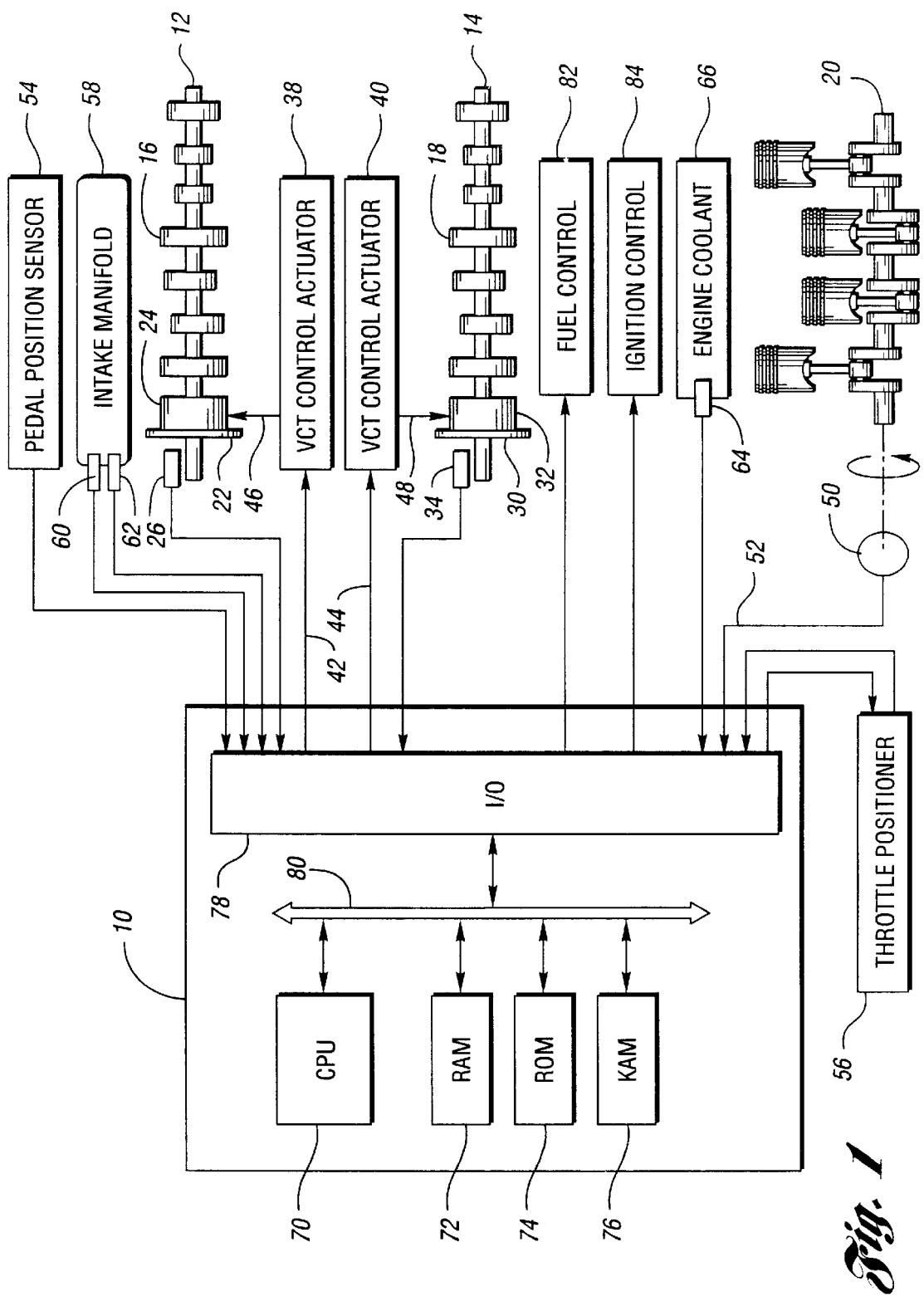
FIG. 1 is a schematic block diagram of a preferred embodiment of the system of the present invention.

Referring now to the drawings and initially to FIG. 1, an internal combustion engine of a vehicle supplies input data to and receives control signals from an electronic engine control (EEC) module generally designated 10. The engine comprises a variable position intake valve camshaft 12 and a variable position exhaust valve camshaft 14 each capable of independently altering the positional relationship of respective cam lobes 16 and 18 to a crankshaft 20. Such dual independent variable position camshafts are described in the aforementioned U.S. Pat. No. 5,117,784 to Schechter et al.

A pulse wheel 22 positioned on a drive gear 24 of the camshaft 12 comprises a plurality of teeth (not shown) positioned in fixed relationship to the cams 16 on the camshaft 12. A variable reluctance sensor (VRS) 26, of known type, detects the angular rotation of the teeth on the pulse wheel 22 as the camshaft rotates and generates a representative Variable Cam Timing/Cylinder Identification (VCT/CID) signal 28 that is supplied to EEC 10. Similarly, a pulse wheel 30 is positioned on a drive gear 32 of the camshaft 14. A VRS 34 detects the angular rotation of the teeth on the pulse wheel 30 as the camshaft rotates and generates a representative Variable Cam Timing/Cylinder Identification (VCT/CID) signal 36 supplied to EEC 10.

Figure 2:
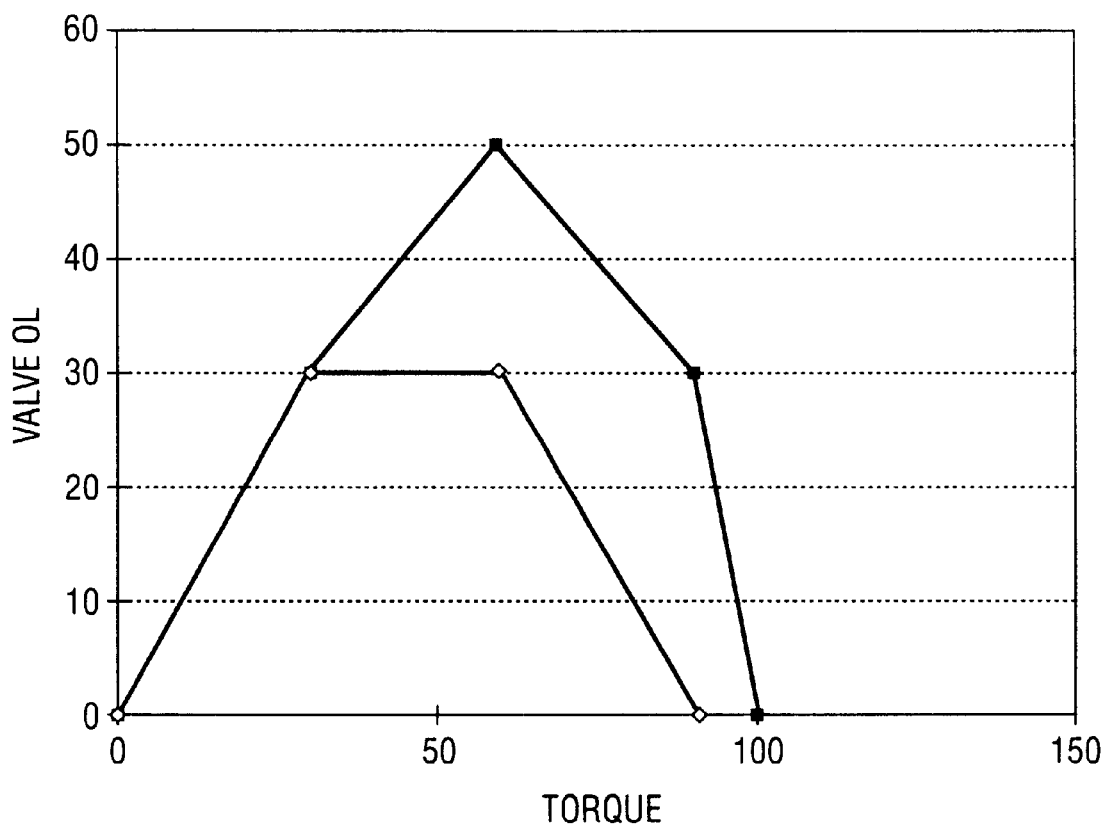
FIG. 2 is a plot comparing valve overlap calibration values for conventional and electronic throttle controls

VCT control actuators 38 and 40 receive camshaft position signals 42 and 44 respectively, from EEC 10, which are indicative of a cam phase angle for the respective camshafts 12 and 14 in degrees from a default phase angle. The actuators 38 and 40 generate respective camshaft control signals 46 and 48 used to control the angular position of camshafts 12 and 14 relative to crankshaft 20. Camshaft position signals 42 and 44 preferably takes the form of a duty cycle signal to reduce sensitivity to voltage fluctuations. A Crankshaft Position Sensor (CPS) 50 generates a CPS signal 52 indicative of the rotational speed of the crankshaft 20. A sensor 54 senses the position of a vehicle operator actuated accelerator pedal and provides an accelerator pedal position signal as an input to the EEC 10. The EEC 10 responds to the signal from the sensor 54 and in accordance with an electronic throttle control (ETC) program drives an appropriate actuator 56 to position the intake air throttle (not shown). Thus, the throttle is set at a position commanded solely by EEC 10. In other words, the vehicle operator has no direct link with the throttle admitting air to the engine's intake manifold generally indicated at 58. Thus, the throttle can be set independently of pedal position, enabling a high valve overlap, and reduced pumping loss. The plot in FIG. 2 compares the valve overlap calibration values using ETC versus those used when the throttle is mechanically linked with the accelerator pedal. The high value of valve overlap available with ETC results from the removal of the constraint that torque must follow throttle movement on a 1 to 1 basis. This results in better fuel economy and lower $NO_x$. A temperature sensor 60 provides an air charge temperature input signal to the EEC 10 which is indicative of the temperature of the air charge entering intake manifold 58. A mass air flow meter 62 is provided for measuring mass air flow into the engine. Another temperature sensor 64 provides an engine coolant temperature input signal to the EEC 10 that is indicative of the temperature of coolant circulating through the engine coolant system generally indicated at 66. A pressure sensor may be included in the intake manifold 58 to measure barometric pressure or barometric pressure may be inferred as is well know in the art.

The EEC module 10 comprises a central processing unit 70, a random-access memory (RAM) 72 for temporary data storage, a read-only memory (ROM) 74 for storing control programs, a keep-alive-memory (KAM) 76 for storing learned values, Input/Output ports 78 including the usual analog to digital and digital to analog converter, and a conventional data bus 80. The EEC 10 receives the various input signals, and processes the data in accordance with a control program that preferably includes a camshaft timing subroutine for determining a desired timing of the camshafts 12 and 14 relative to the crankshaft 20. The control program also preferably includes a duty cycle calculation subroutine for computing separate correction signals activating the actuators 38 and 40 to correct the timing of the camshafts 12 and 14, respectively, to the desired relationship with the crankshaft 20, the position of which is determined from the CPS signal 52. The control program in the EEC 10 also provides output control signals to fuel control block 82 to control the amount of fuel injected by injectors within the engine, and ignition control block 84 to control the ignition timing of the air/fuel mixture within the combustion chambers of the engine.

Figure 4:
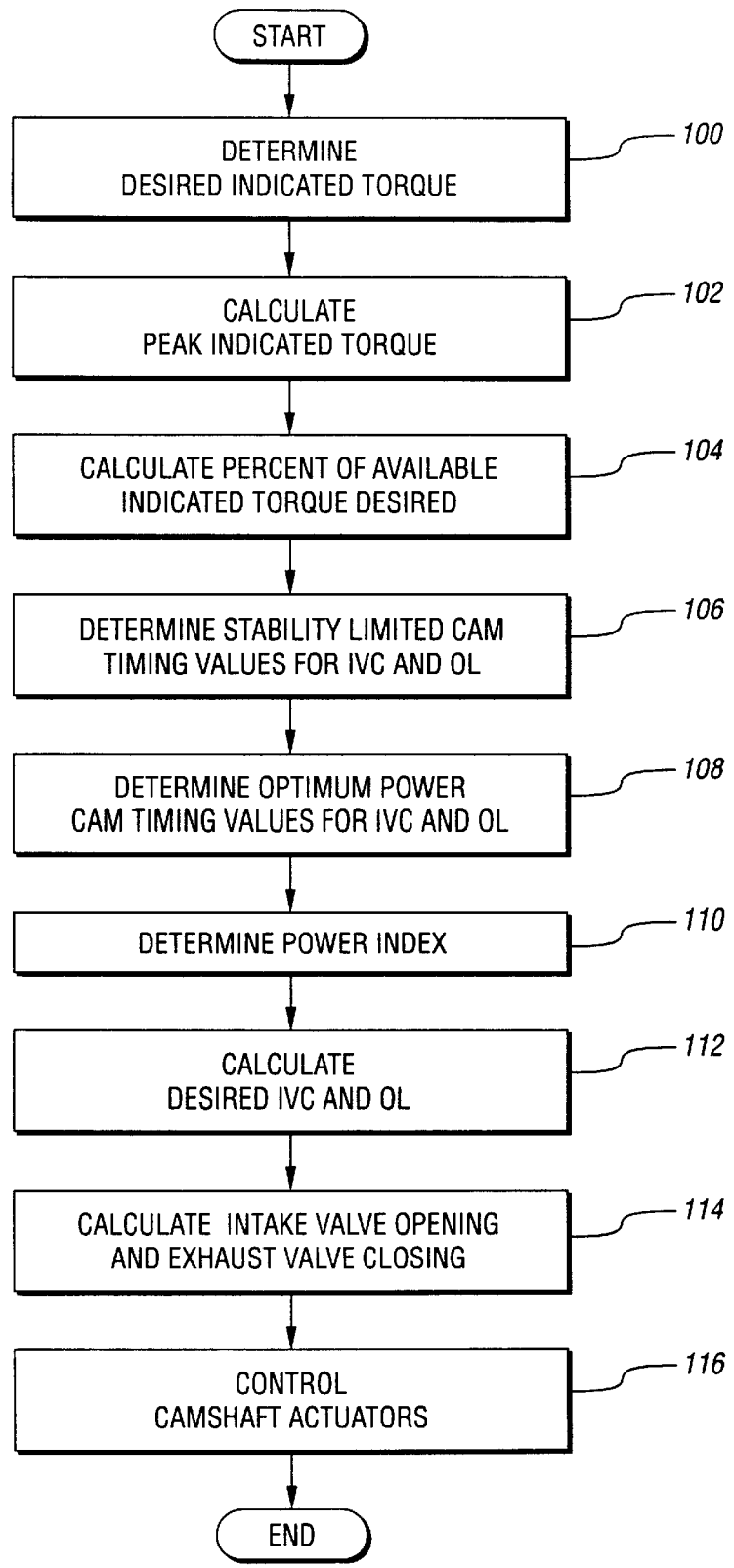
FIG. 4 is a flowchart showing the operation of a preferred embodiment.

A preferred embodiment advantageously determines an intake valve closing (IVC) phase angle and valve overlap (OL) over the operating range of engine speed and indicated torque and generates camshaft position signals 42 and 44 as a function of the IVC and OL in order to optimize fuel economy, emissions and power at all altitudes, by executing the camshaft timing routine shown in FIG. 4. The steps in FIG. 4 are preferably executed by the EEC 10 in a background loop. The camshaft timing routine determines the operator desired engine indicated torque at block 100. The indicated torque is the total torque produced on the top of the piston and may be calculated from the equation:

$$\text{Desired\_indicated\_torque} = \text{desired\_brake\_torque} + \text{friction\_torque}$$

The desired brake torque is preferably obtained from a ROM based calibration lookup tableA as a function of engine speed (n) and accelerator pedal position (pp) as expressed by the following equation:

$$\text{Desired\_brake\_torque} = \text{tableA}(n, pp)$$

The friction torque may be estimated from a ROM calibration tableB as a function of engine speed and air charge (air_chg) plus modeled accessory losses as expressed by the following equation:

$$\text{Friction\_torque} = \text{tableB}(n, \text{air\_chg}) + \text{accessory\_loss}$$

At block 102, peak indicated torque is preferably obtained from a ROM based calibration lookup tableC, modified as indicated below for a given air charge temperature (act) and barometric pressure (bp).

$$\text{Peak\_indicated\_torque} = \text{tableC}(n) * bp/29.92 * \sqrt{560/(act+460)}$$

where tableC is a calibratable table of observed peak indicated torque at standard temperature (100° F.) and pressure (29.92 in.hg.) at the optimal cam timings for power (OP).

At block 104, the desired indicated torque as a percentage of the available peak indicated torque is calculated:

$$\text{Desired\_percent\_peak\_indicated torque} = \text{desired\_indicated\_torque}/\text{peak\_indicated\_torque}$$

The calibration for best fuel economy and emissions is entered in ROM based calibration lookup tables referred to as stability limited (SL) cam timing schedule tables. This calibration is often limited by combustion stability and these limits must be met at high altitude as well as sea level where the calibration was most likely derived. Experience and theory suggest that engine indicated torque is a good predictor of such stability limits. In block 106, an intake valve closing (IVC) value, in degrees, is obtained for the current engine speed and demanded indicated torque from an SL calibration table1. Table1 is populated with IVC calibration values as a function of demanded indicated torque over the operating range of engine speed. Also in block 106, a valve overlap (OL) value, in degrees, is obtained for the current engine speed and demanded indicated torque from a SL calibration table2. Table2 is populated with OL calibration values that are also a function of demanded indicated torque over the operating range of engine speed. In block 108, an IVC value and a OL value are obtained respectively from ROM based calibration table3 and ROM based calibration table4. These tables represent timing values for optimal power (OP) and are populated with IVC and OL values as a function of engine speed only. The construction of an engine is such that a torque input is not required for table3 and table4.

Figure 3:
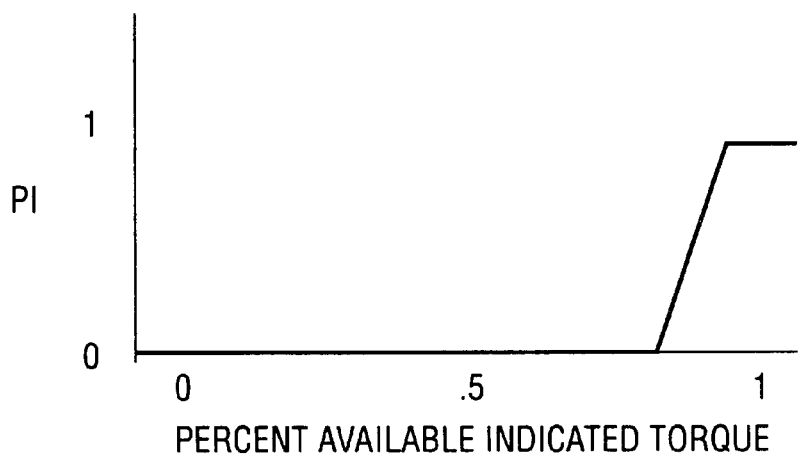
FIG. 3 is a chart of Power Index versus percent of available indicated torque demanded.

At block 110, a power index (PI) is obtained from a ROM based lookup table5 populated with values from 0 to 1 in accordance with the chart of FIG. 3. The PI represents the relative desire of the customer for economy or power and is obtained as a function of the percent of available indicated torque demanded by the vehicle operator as calculated in block 104. An operator demand of less than approximately 80% of the peak indicated torque available produces a PI of 0 indicative of a desire for economy. From about 80% to 90% of peak available indicated torque demand, a PI of between approximately 0 and 0.9 are produced. Above approximately 90%, a PI of 1 is produced.

At block 112, the desired IVC and OL are calculated using the PI obtained from block 110 to interpolate between the values contained in the SL tables (table1 and table2) and the OP tables (table3 and table4). The desired IVC and desired OL may be calculated in accordance with the following equations:

$$IVC\_DESIRED=PI*OP\_IVC+(1-PI)*SL\_IVC$$

$$OL\_DESIRED=PI*OP\_OL+(1-PI)*SL\_OL$$

where:

PI=table5(desired_percent_indicated_tq

SL_IVC=table1(n,desired_indicated_torque)

SL_OL=table2(n,desired_indicated_torque)

OP_IVC=table3(n)

OP_OL=table4(n)

These desired IVC and OL values are converted to other valve timing metrics. Using a ROM parameter INTAKE_DURATION, intake valve opening and exhaust valve closing are calculated as indicated in block 114 in accordance with the equations:

$$intake\_valve\_opening=IVC-INTAKE\_DURATION\ exhaust\_valve\_closing=intake\_valve\_opening+OL.$$

These are the chosen points of reference for control of the camshaft actuators 38 and 40 as indicated in block 116. Other points of reference can be calculated using algebraic methods known in the art.

The principles of the present invention can also be applied to other engine control features such as variable intake cam lift and/or variable exhaust cam lift. A variable lift system would entail additional ROM based calibration lookup tables populated with values of lift. A pair of tables of stability limited lift as a function of engine speed and indicated torque, analogous to table1 and table2 and a pair of tables of optimum power lift as a function of engine speed, analogous to table3 and table4, would be used. The interpolation of optimal lift would utilize the PI of table5.

While the best mode for carrying out the invention has been described in detail, those familiar with the art to which this invention relates will recognize various alternative designs and embodiments for practicing the invention as defined by the following claims.

What is claimed:

1. A method of cam timing comprising a sequence of the steps of:

determining a stability limited valve timing value as a function of engine speed and desired engine indicated torque;

determining an optimum power valve timing value as a function of engine speed;

determining a power index value as a function of percentage of peak engine indicated torque available to meet a demanded indicated torque; and determining a desired valve timing value based on said power index value, said stability limited valve timing value and said optimum power valve timing value.

2. The method defined in claim 1 wherein the valve timing value is an intake valve closing value.

3. The method defined in claim 1 wherein the valve timing value is a valve overlap value.

4. A method of cam timing comprising a sequence of the steps of:

determining a stability limited intake valve closing value and a stability limited valve overlap value as a function of engine speed and desired indicated torque;

determining an optimum power intake valve closing value and an optimum power valve overlap value as a function of engine speed;

determining a power index value as a function of percentage of peak engine indicated torque available to meet a demanded indicated torque;

determining a desired intake valve closing value based on said power index value, said stability limited intake valve closing value and said optimum power intake valve closing value; and determining a desired valve overlap based on said power index, said stability limited valve overlap value and said optimum power valve overlap value.

5. The invention defined by claim 4 further comprising the step of:

calculating a desired intake valve opening value and a desired exhaust valve closing value based on said desired intake valve closing value and said desired valve overlap value.

6. The method of claim 5 further comprising the step of controlling the position of a camshaft relative to a crankshaft to achieve said desired intake valve opening value and said desired exhaust valve closing value.

7. The invention defined by claim 6 further comprising the steps of:

calculating a desired intake valve opening value and a desired exhaust valve closing value based on said desired intake valve closing value and said desired valve overlap value; and controlling the position of a camshaft relative to a crankshaft to achieve said desired intake valve opening value and said desired exhaust valve closing value.

8. The method of claim 5 further comprising the step of controlling the position of first and second camshafts relative to a crankshaft to achieve said desired intake valve opening value independently of said desired exhaust valve closing value.

9. The invention defined by claim 8 further comprising the steps of:

calculating a desired intake valve opening value and a desired exhaust valve closing value based on said desired intake valve closing value and said desired valve overlap value; and controlling the position of first and second camshafts relative to a crankshaft to achieve said desired intake valve opening value independently of said desired exhaust valve closing value.

10. The invention defined by claim 4 further including the steps of:

determining a desired engine brake torque as a function of engine speed and accelerator pedal position;

calculating a desired engine indicated torque from desired engine brake torque and friction torque;

calculating an available peak engine indicated torque as a function of engine speed, air charge temperature, and barometric pressure; and calculating the percentage of peak engine indicated torque available to meet said desired engine indicated torque.

11. A variable camshaft timing system for an engine comprising:

means for determining engine speed;

means for determining demanded engine brake torque;

means for determining a stability limited intake valve closing value and a stability limited valve overlap value as a function of engine speed and demanded engine indicated torque;

means for determining an optimum power intake valve closing value and an optimum power valve overlap value as a function of engine speed;

means for determining a power index value as a function of percentage of peak engine indicated torque available to meet a demanded engine indicated torque;

means for determining a desired intake valve closing value based on said power index value, said stability limited intake valve closing value and said optimum power intake valve closing value; and means for determining a desired valve overlap based on said power index, said stability limited valve overlap value and said optimum power valve overlap value.

12. The invention defined by claim 11 further comprising:

means for calculating a desired intake valve opening value and a desired exhaust valve closing value based on said desired intake valve closing value and said desired valve overlap value.

13. The invention defined by claim 12 further comprising:

means for determining a desired engine brake torque as a function of engine speed and accelerator pedal position;

means for calculating a desired engine indicated torque from desired engine brake torque and friction torque;

means for calculating an available peak engine indicated torque as a function of engine speed, air charge temperature, and barometric pressure; and means for calculating the percentage of peak engine indicated torque available to meet said desired engine indicated torque.

14. The invention defined by claim 13 further comprising:

means for controlling the position of first and second camshafts relative to a crankshaft to achieve said desired intake valve opening value independently of said desired exhaust valve closing value.

15. An article of manufacture comprising:

a computer storage medium having a computer program encoded therein for controlling the cam timing of an engine, said computer storage medium comprising:

code for determining a stability limited intake valve closing value and a stability limited valve overlap value as a function of engine speed and demanded engine indicated torque;

code for determining an optimum power intake valve closing value and an optimum power valve overlap value as a function of engine speed;

code for determining a power index value as a function of percentage of peak engine indicated torque available to meet a demanded engine indicated torque;

code for determining a desired intake valve closing value based on said power index value, said stability limited intake valve closing value and said optimum power intake valve closing value;

code for determining a desired valve overlap based on said power index, said stability limited valve overlap value and said optimum power valve overlap value; and code for calculating a desired intake valve opening value and a desired exhaust valve closing value based on said desired intake valve closing value and said desired valve overlap value.

16. The invention defined by claim 15 further comprising:

code for determining a desired engine brake torque as a function of engine speed and accelerator pedal position;

calculating a desired engine indicated torque from desired engine brake torque and friction torque;

code for calculating an available peak engine indicated torque as a function of engine speed, air charge temperature, and barometric pressure; and code for calculating the percentage of peak engine indicated torque available to meet said desired engine indicated torque.

17. The invention defined by claim 16 further comprising:

code for controlling the position of first and second camshafts relative to a crankshaft to achieve said desired intake valve opening value independently of said desired exhaust valve closing value.

18. A method of cam timing comprising a sequence of the steps of:

determining a stability limited intake valve value and a stability limited exhaust valve value as a function of engine speed and desired indicated torque;

determining an optimum power intake valve value and an optimum power exhaust valve value as a function of engine speed;

determining a power index value as a function of percentage of peak engine indicated torque available to meet a demanded indicated torque;

determining a desired intake valve value based on said power index value, said stability limited intake valve value and said optimum power intake valve value; and determining a desired exhaust valve value based on said power index, said stability limited exhaust valve value and said optimum power exhaust valve value.

19. The invention defined in claim 18 wherein the valve values are lift.

20. The invention defined in claim 18 wherein the valve values are phase angle 1.

* * * * *